US008743218B2

(12) United States Patent
Tsuchida

(10) Patent No.: US 8,743,218 B2
(45) Date of Patent: Jun. 3, 2014

(54) IMAGING APPARATUS INCLUDING A SHAKE CORRECTION FUNCTION

(75) Inventor: Yukitaka Tsuchida, Osaka (JP)

(73) Assignee: Panasonic Corporation, Osaka (JP)

( * ) Notice: Subject to any disclaimer, the term of this patent is extended or adjusted under 35 U.S.C. 154(b) by 82 days.

(21) Appl. No.: 13/021,160

(22) Filed: Feb. 4, 2011

(65) Prior Publication Data

US 2011/0273572 A1 Nov. 10, 2011

(30) Foreign Application Priority Data

Feb. 9, 2010 (JP) ................................ 2010-026175

(51) Int. Cl.
*H04N 5/228* (2006.01)
(52) U.S. Cl.
USPC ............... 348/208.4; 396/55; 348/99; 348/2; 348/5
(58) Field of Classification Search
CPC ....................... H04N 5/23261; H04N 5/23248
USPC ..................................... 348/208.4; 396/52–55
See application file for complete search history.

(56) References Cited

U.S. PATENT DOCUMENTS

| | | | | |
|---|---|---|---|---|
| 5,852,749 | A * | 12/1998 | Konno et al. | 396/55 |
| 7,443,422 | B2 * | 10/2008 | Usui | 348/208.11 |
| 2001/0043809 | A1 * | 11/2001 | Sato et al. | 396/52 |
| 2004/0017485 | A1 * | 1/2004 | Ohishi | 348/208.99 |
| 2004/0201707 | A1 * | 10/2004 | Noguchi et al. | 348/208.7 |
| 2006/0127071 | A1 * | 6/2006 | Takeuchi et al. | 396/55 |
| 2009/0040319 | A1 * | 2/2009 | Habe | 348/208.4 |
| 2013/0063615 | A1 * | 3/2013 | Takeuchi | 348/208.5 |

FOREIGN PATENT DOCUMENTS

JP 2005-195656 7/2005

* cited by examiner

*Primary Examiner* — Roberto Velez
*Assistant Examiner* — Cynthia Segura
(74) *Attorney, Agent, or Firm* — Wenderoth, Lind & Ponack, L.L.P.

(57) ABSTRACT

An imaging apparatus includes a correction lens correcting a shake of an image on an imaging device, a driver driving the correction lens, a detector detecting an amount of shake of the imaging apparatus, a determining unit determining, based on an amplitude of an output from the detector, whether the shake is within a normal range, and a controller controlling the driver based on a result of the determination. The controller controls the driver to drive the correction lens in a first mode when the shake is within the normal range, the first mode driving the correction lens according to a result of the detection, and to stop the correction lens or drive the correction lens in a second mode when the shake is out of the normal range of camera shake, the second mode suppressing an amount of movement of the correction lens more than for the first mode.

4 Claims, 5 Drawing Sheets

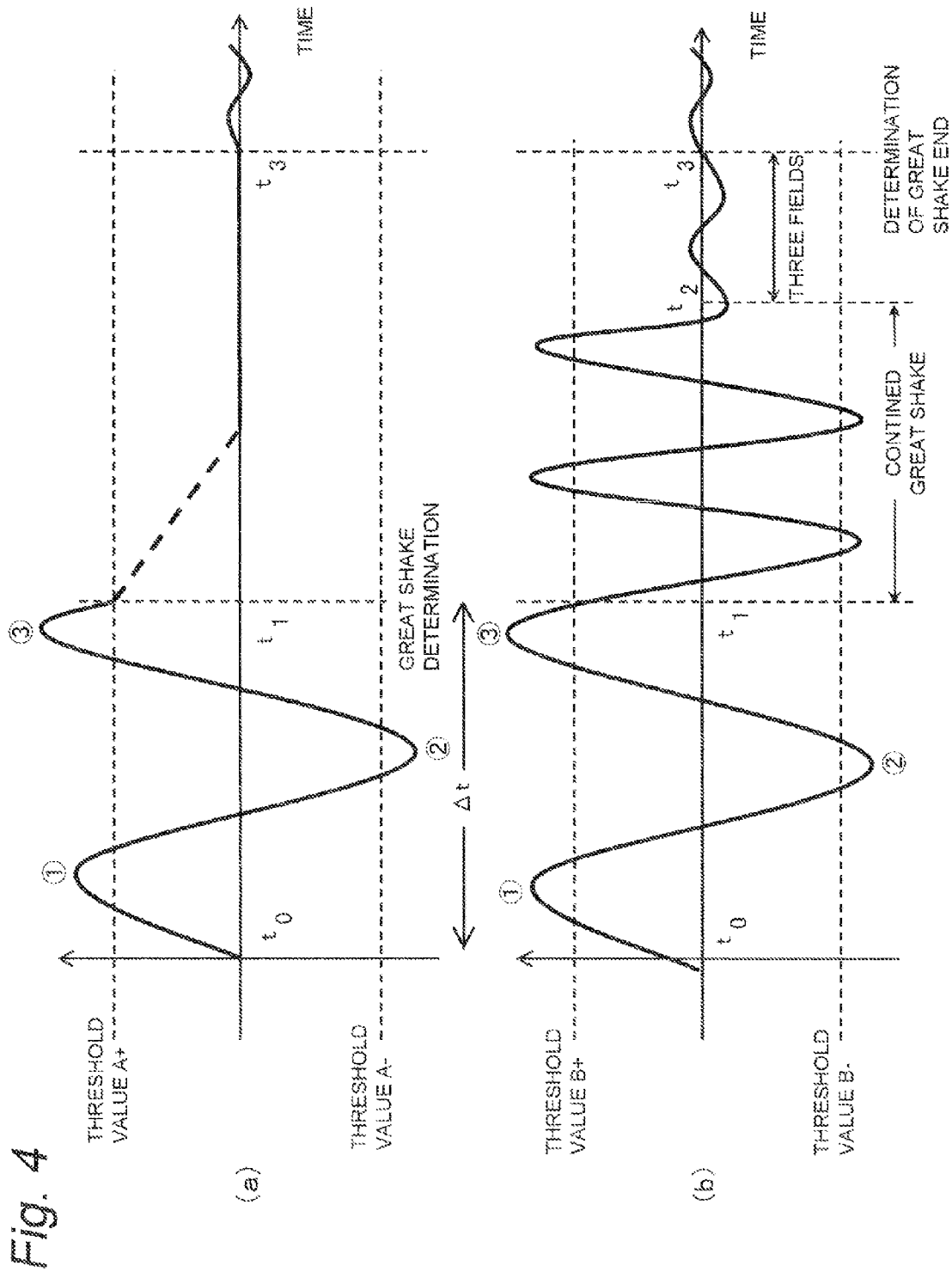

IMAGING APPARATUS INCLUDING A SHAKE CORRECTION FUNCTION

BACKGROUND

1. Technical Field

The present invention relates to an imaging apparatus, and more particularly to an imaging apparatus having a camera shake correction function.

2. Related Art

Patent Document 1 discloses a digital camera equipped with a camera shake correction function. The digital camera detects a jiggle of the digital camera by a jiggle detector and controls the operation of a correction lens for camera shake correction according to the detected amount of jiggle, and thereby cancels the jiggle of the digital camera. In particular, the digital camera described in JP 2005-195656 A drives the camera shake correction function when the zoom magnification is greater than a reference magnification, and stops the camera shake correction function when the zoom magnification is smaller than the reference magnification. This control enables to perform camera shake correction with less jiggle, according to the zoom magnification.

When the correction lens is moved significantly for camera shake correction, due to the inertia of the correction lens, the correction lens may move beyond a control position. Thus, when a great shake of the digital camera is detected and the correction lens is moved to a position near an end of its movable range in order to cancel the shake, the correction lens may be moved beyond a control position due to its inertia, which may cause a problem that the correction lens physically collides with the end of the movable range. The collision of the correction lens generates the sound of collision, by which a user may think of a breakdown of the digital camera. In addition, the collision may cause a breakdown. Due to recent advances in the miniaturization of digital cameras, the gap between the end of the movable range of the correction lens and a lens barrel unit where the correction lens is contained tends to decrease. Thus, problems such as those described above are likely to occur.

SUMMARY

An object of the present invention is therefore to provide an imaging apparatus that can reduce the likelihood that a correction lens used for camera shake correction physically collides with an end of its movable range.

In a first aspect, there is provided an imaging apparatus. The imaging apparatus includes: an optical system; an imaging device configured to capture a subject image formed by the optical system; a correction lens configured to correct a shake of the subject image formed on the imaging device; a driver configured to drive the correction lens; a detector configured to detect an amount of shake of the imaging apparatus; a determining unit configured to determine, based on an amplitude of an output from the detector, whether or not the shake of the imaging apparatus is within a normal range of camera shake; and a controller configured to control the driver based on a result of determination made by the determining unit. The controller controls the driver so as to drive the correction lens in a first mode when it is determined by the determining unit that the shake of the imaging apparatus is within the normal range of camera shake, the first mode being such that the correction lens is driven according to a result of detection by the detector. Also, the controller controls the driver so as to stop the correction lens or to drive the correction lens in a second mode when it is determined by the determining unit that the shake of the imaging apparatus is out of the normal range of camera shake, the second mode being such that an amount of movement of the correction lens is suppressed more than that for the first mode.

According to the present invention, when a shake that is out of a normal range of camera shake is detected, the movement of a correction lens for camera shake correction is stopped or suppressed, enabling to reduce the likelihood of the correction lens physically colliding with an end of its movable range. By this, the occurrence of the sound of collision is suppressed, enabling to reduce the likelihood that a user mistakenly believes that an imaging apparatus has broken down. In addition, a breakdown caused by collision can be reduced.

BRIEF DESCRIPTION OF DRAWINGS

FIG. 4 is a diagram describing a relationship between an output from a detector that detects a position of a correction lens in the OIS and drive of the OIS in (a), and is a diagram describing a relationship between an output from a gyro sensor and drive of the OIS in (b).

DETAILED DESCRIPTION OF PREFERRED EMBODIMENT

1. First Embodiment

1-1. Configuration

Figure 1:
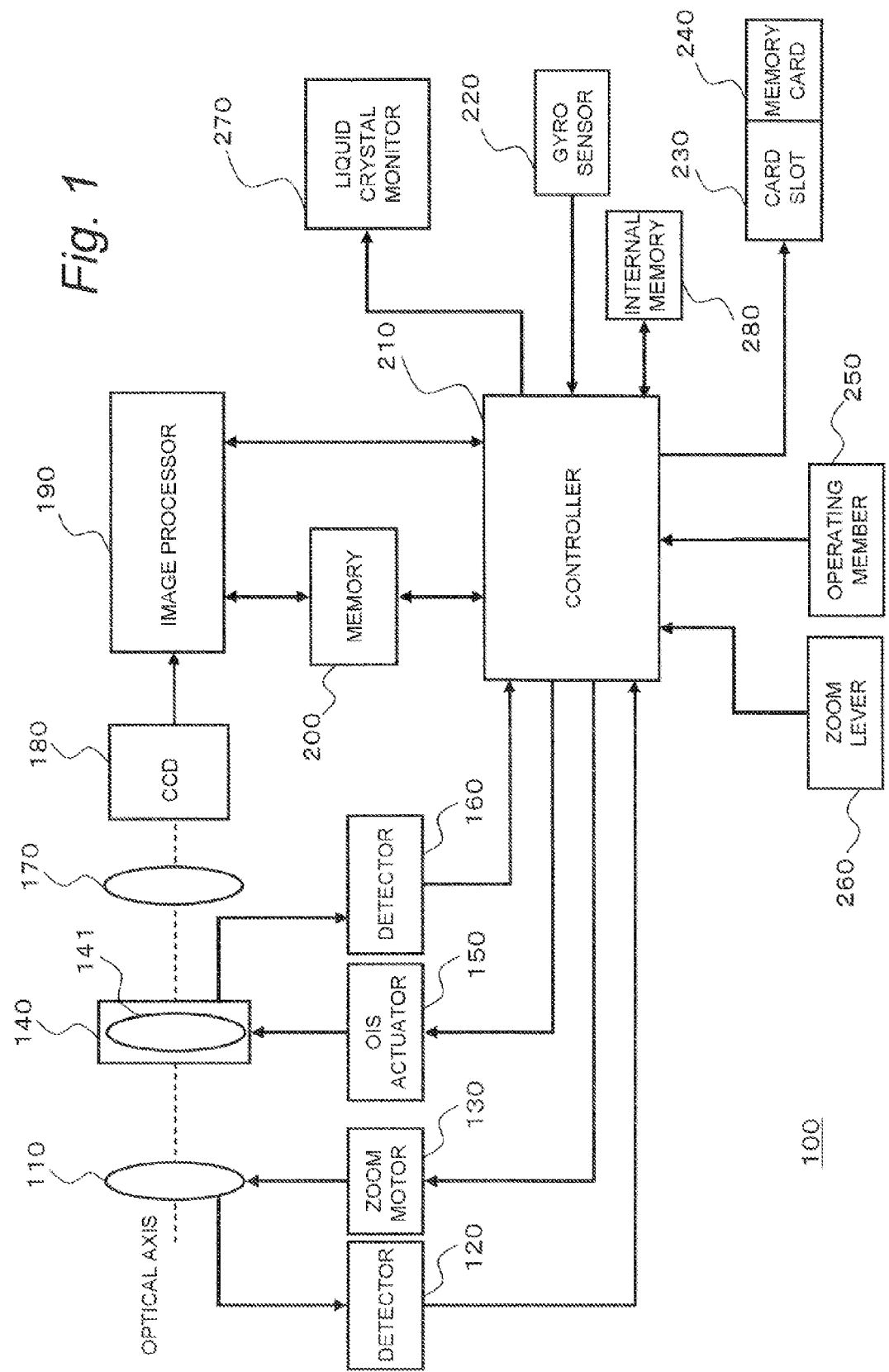
FIG. 1 is a block diagram showing a configuration of a digital video camera according to an embodiment.

An electrical configuration of a digital video camera 100 according to the present embodiment will be described using FIG. 1. FIG. 1 is a block diagram showing a configuration of the digital video camera 100. The digital video camera 100 captures a subject image formed by an optical system including a zoom lens 110 and the like, on a CCD image sensor 180. Image data generated by the CCD image sensor 180 is subjected to predetermined processes by an image processor 190. The processed image data is stored in a memory card 240. The image data stored in the memory card 240 can be displayed (played back) on a liquid crystal monitor 270. The configuration of the digital video camera 100 will be described in more detail below.

The optical system of the digital video camera 100 includes the zoom lens 110, an OIS (Optical Image Stabilizer) 140, and a focus lens 170. The zoom lens 110 can zoom in or zoom out a subject image by moving along an optical axis of the optical system. The focus lens 170 adjusts the focus state of a subject image by moving along the optical axis of the optical system.

The OIS 140 includes, therein, a correction lens 141 which is movable in a plane perpendicular to the optical axis. The OIS 140 drives the correction lens 141 in a direction in which a shake of the digital video camera 100 is compensated for, to reduce a shake of a subject image formed on the CCD image sensor 180.

A zoom motor 130 drives the zoom lens 110. The zoom motor 130 may be implemented by a pulse motor, a DC motor, a linear motor, a servomotor and the like. The zoom motor 130 may drive the zoom lens 110 through a cam mechanism or a mechanism such as a ball screw. A detector 120 detects a position of the zoom lens 110 on the optical axis. The detector 120 outputs a signal indicating the position of the zoom lens 110 by a switch such as a brush, according to the movement of the zoom lens 110 in an optical axis direction.

An OIS actuator 150 drives the correction lens 141 in the OIS 140 in the plane perpendicular to the optical axis. The OIS actuator 150 can be implemented by a planar coil, an ultrasonic motor and the like. A detector 160 detects an amount of movement of the correction lens 141 in the OIS 140. The OIS 140 feeds back, to the OIS actuator 150, the position of the correction lens 141 in the OIS 140 detected by the detector 160 with respect to an amount of drive of the OIS actuator 150 specified by a controller 210 and holds the position of the correction lens 141.

The CCD image sensor 180 captures a subject image formed by the optical system including the zoom lens 110 and the like, to generate image data. The CCD image sensor 180 performs various operations such as exposure, transfer, electronic shutter.

The image processor 190 performs various processes on the image data generated by the CCD image sensor 180. The image processor 190 performs a process on the image data generated by the CCD image sensor 180, to generate image data to be displayed on the liquid crystal monitor 270 or to generate image data to be re-stored in the memory card 240. For example, the image processor 190 performs various processes such as gamma correction, white balance correction, and flaw correction, on the image data generated by the CCD image sensor 180. In addition, the image processor 190 compresses the image data generated by the CCD image sensor 180, using a compression format compliant with the JPEG standard and the like. The image processor 190 can be implemented by a DSP, a microcomputer and the like.

The controller 210 is a control unit that controls the overall operation of the digital video camera 100. The controller 210 can be implemented by a semiconductor device and the like. The controller 210 may be composed of only hardware or may be implemented by combining hardware and software. The controller 210 can be implemented by a microcomputer and the like.

A memory 200 functions as a working memory for the image processor 190 and the controller 210. The memory 200 can be implemented by, for example, a DRAM or a ferroelectric memory.

The liquid crystal monitor 270 can display an image represented by image data which is generated by the CCD image sensor 180, or an image represented by image data which is read from the memory card 240.

A gyro sensor 220 is composed of a vibrating member such as a piezoelectric element and the like. The gyro sensor 220 allows the vibrating member such as a piezoelectric element to be vibrated at a fixed frequency, and converts a force by the Coriolis force into a voltage and thereby obtains angular velocity information. Angular velocity information is obtained from the gyro sensor 220, and the correction lens 141 in the OIS 140 is driven in a direction in which a shake obtained based on the angular velocity information is compensated for. By this, the digital video camera 100 cancels the influence on a captured image exerted by user camera shake.

A card slot 230 can allow the memory card 240 to be placed therein. The card slot 230 can be mechanically and electrically connected to the memory card 240. The memory card 240 includes a flash memory, a ferroelectric memory and the like, therein, and can store data.

An internal memory 28C is composed of a flash memory, a ferroelectric memory and the like. The internal memory 280 stores a control program for controlling the entire digital video camera 100 and the like.

An operating member 250 is a collective term for members (buttons, a dial and the like.) that accept operation instructions from the user. A zoom lever 260 is a member that accepts an instruction to change the zoom magnification from the user.

1-2. Operation 1-2-1 Drive Control of OIS

Figure 2A:
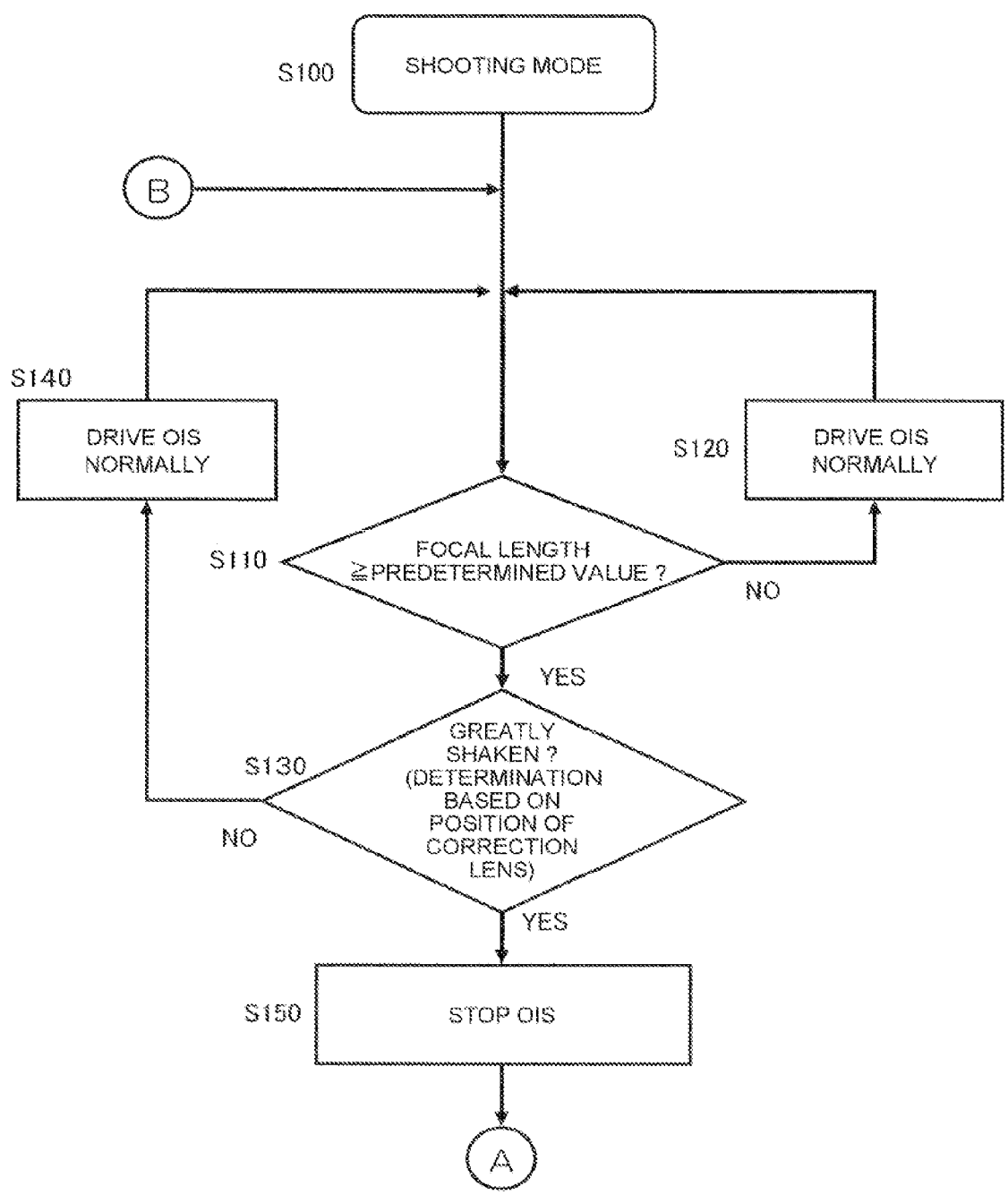
FIG. 2A is a flowchart showing a drive control operation of an OIS in shooting mode where camera shake correction is performed.
Figure 2B:
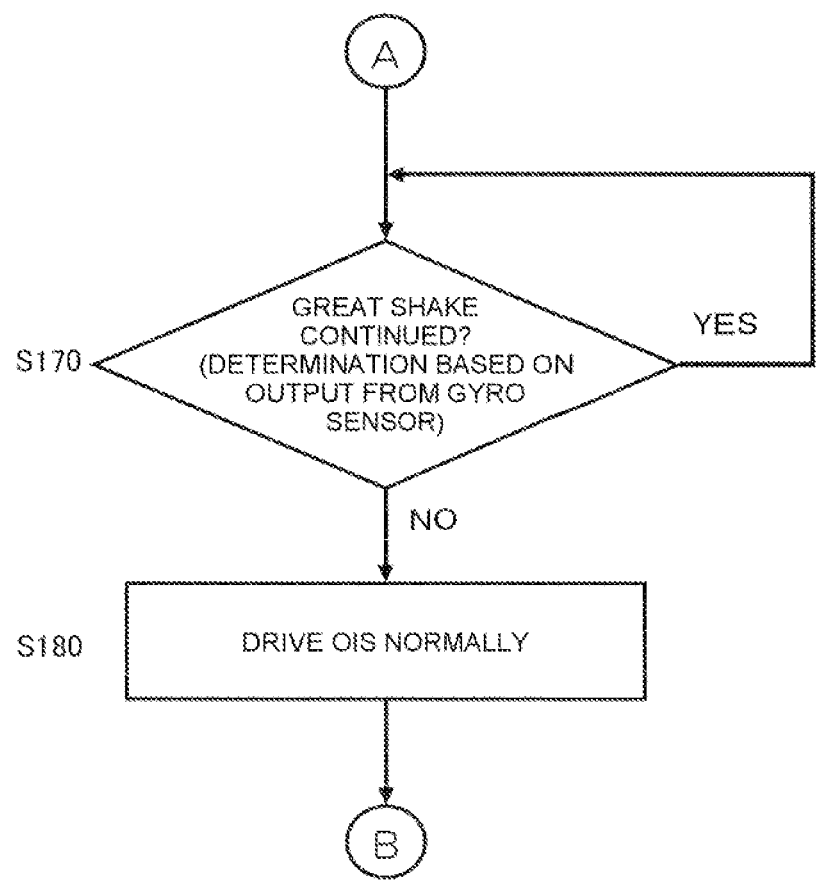
FIG. 2B is a flowchart showing the drive control operation of the OIS in shooting mode where camera shake correction is performed (continued from FIG. 2A).

Drive control of the OIS will be described with reference to FIGS. 2A and 2B in shooting mode where camera shake correction of the digital video camera 100 according to the present embodiment is performed. FIGS. 2A and 2B are flowcharts for describing drive control of the OIS 140 in shooting mode where camera shake correction is performed.

The user can set the digital video camera 100 to shooting mode where camera shake correction is performed, by operating the operating member 250. When the digital video camera 100 is set to shooting mode where camera shake correction is performed (S100), the controller 210 detects a current focal length. Specifically, the controller 210 detects a position of the zoom lens 110 to detect a current focal length. The controller 210 determines whether the focal length is greater than or equal to a predetermined value (e.g., 595 mm) (S110). If the focal length is less than the predetermined value (NO at S110), then the controller 210 controls the OIS actuator 150 to drive the OIS 140 in normal drive mode (first mode) (S120). Here, the normal drive mode is a mode in which the OIS 140 (that is, the correction lens 141) is driven so as to compensate for a detected shake according to the amount of shake detected by the gyro sensor 220.

Note that in the present embodiment, even if the detected amounts of shake are the same, the amount of movement of the correction lens 141 in the OIS 140 is changed according to the focal length. Specifically, the digital video camera 100 sets the amount of movement of the correction lens 141 for the case of a telephoto focal length, to a larger value than that set for the case of a wide-angle focal length. This is because, in a system in which the OIS 140 is disposed closer to the side of the CCD 180 than the side of the zoom lens 110, a captured image is more susceptible to camera shake in the case of a telephoto focal length than in the case of a wide-angle focal length.

If, on the other hand, the focal length is greater than or equal to the predetermined value (YES at S110), then the controller 210 determines whether or not the digital video camera 100 is shaken greatly by the user (S130). A process of determining whether or not the digital video camera 100 is shaken greatly will be described in detail later.

If it is determined that the digital video camera 100 is not shaken greatly (NO at S130), then the controller 210 controls the OIS actuator 150 to drive the OIS 140 in normal drive mode (first mode) (S140).

On the other hand, if it is determined that the digital video camera 100 is shaken greatly (YES at S130), then the controller 210 controls the OIS actuator 150 in a different drive mode (second mode) from the normal drive mode (first mode). Specifically, the controller 210 controls the OIS actuator 150 to stop the drive of the OIS 140 (S150) and then transitions to control for great shake detection (S170).

In control for great shake detection, the controller 210 determines whether or not the digital video camera 100 is continuously shaken greatly (S170). A detailed operation for a determination as to whether the great shake continues (hereinafter, referred to as a "great shake continuation determination") will be described later. If it is determined that the great shake continues (YES at S170), then the controller 210 repeats this determination. The repetition is performed in a predetermined cycle. On the other hand, if it is determined that the great shake does not continue (NO at S170), then the controller 210 controls the OIS actuator 150 to resume the drive of the OIS 140 in normal drive mode (S180). When the normal drive of the OIS 140 is resumed, the controller 210 returns to control in normal shooting mode. Specifically, the process returns to step S110 and the controller 210 performs the same control as that described above.

1-2-1-1 Great Shake Determination

First, a "great shake" which is detected by the digital video camera 100 according to the present embodiment will be described.

Figure 3:
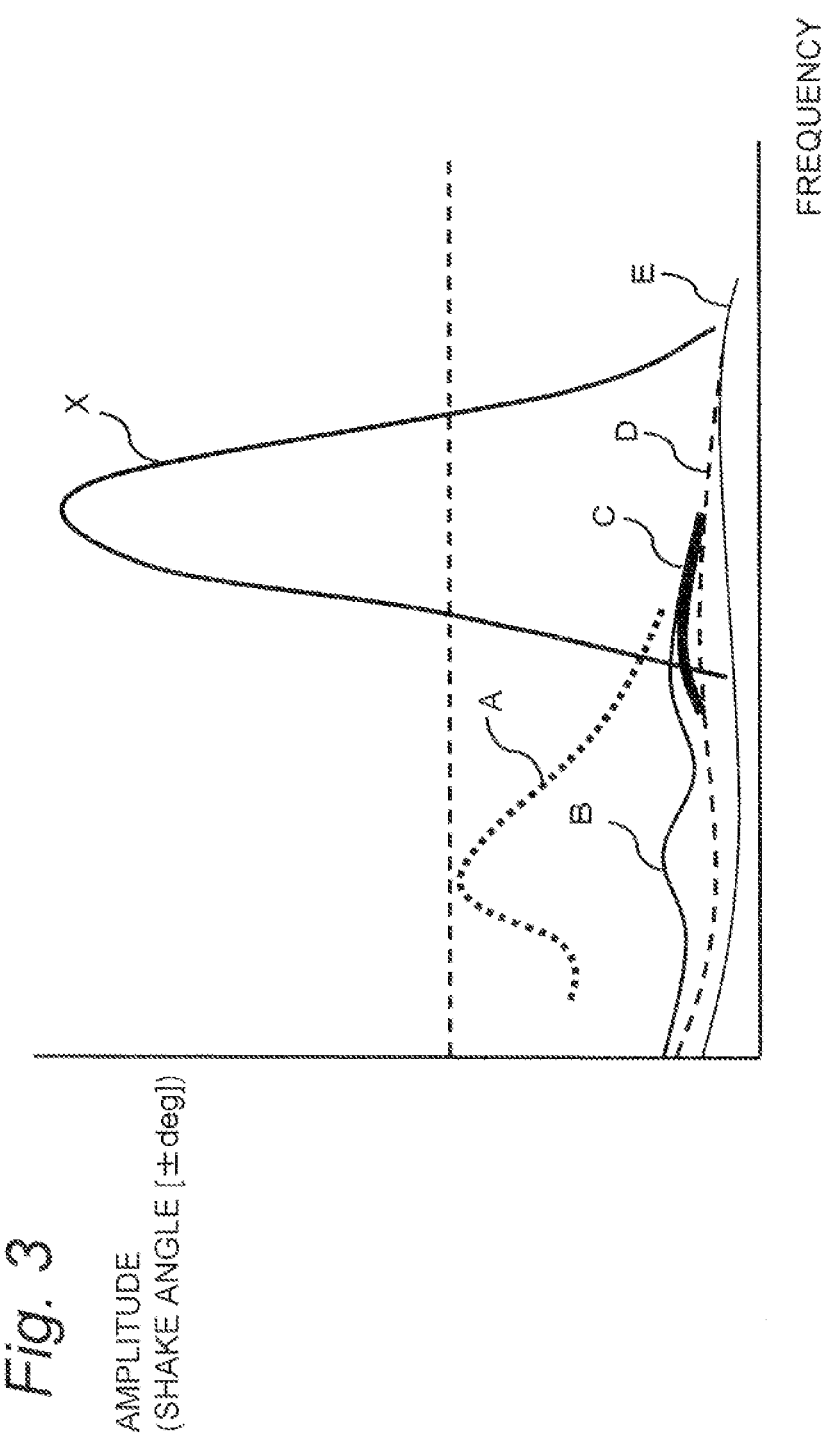
FIG. 3 is a diagram showing the characteristics of various camera shakes which can occur on the digital video camera.

FIG. 3 is a diagram showing examples of the output from the gyro sensor 220 according to various camera shakes (vibrations) which can occur on the digital video camera 100. A horizontal axis represents the frequency of the output signal from the gyro sensor 220, and a vertical axis represents the amplitude of the output signal from the gyro sensor 220. The amplitude of the output signal from the gyro sensor 220 reflects the shake angle (deg) of the digital video camera 100.

Characteristics A to E represent the characteristics of camera shakes (vibrations) which can normally occur when the user shoots an image. These camera shakes are the targets of camera shake correction performed by the OIS 140. Meanwhile, a characteristic X represents a characteristic of a camera shake that occurs when, for example, the digital video camera 100 is moved suddenly or very significantly and that is considered to be unlikely to occur in movement of the digital video camera 100 during normal image shooting. That is, it is considered that, when the user performs image shooting normally, he/she does not move the position of the digital video camera 100 suddenly or very significantly. Hence, it is considered that a camera shake with a large amplitude represented by the characteristic X cannot occur during normal image shooting. It is considered that a camera shake represented by the characteristic X can occur at times other than during image shooting, e.g., when the user drops the camera or when the camera swings greatly while the user is moving with the camera being held by him/her. Such a camera shake is not the target of camera shake correction performed by the OIS 140 in the first place.

As shown by the characteristics A to E, the amplitudes of camera shakes (vibrations) which can occur during image shooting are within a range less than or equal to a certain value. In contrast, for the camera shake (vibration) represented by the characteristic X, the frequency thereof is included in the same frequency band as that of the camera shakes (vibrations) which can occur during image shooting, but the amplitude thereof has a very large value.

Thus, by observing the amplitude of an output signal from the gyro sensor 220, it can be distinguished between a camera shake (vibration) which can occur during image shooting and a camera shake (vibration) which cannot occur during image shooting. In the present embodiment, a vibration exceeding a normal (e.g., a specified) range of camera shake such as that shown by the characteristic X, that is, a sudden or very large vibration which is not the target of camera shake correction, is detected as a "great shake". Then, when a great shake is not detected, the OIS 140 is driven in normal drive mode (first mode). When a great shake is detected, the OIS 140 is driven in a specific drive mode (second mode).

A great shake determination operation will be specifically described with reference to FIG. 4. FIG. 4 is a diagram showing the changes over time of the position of the correction lens 141 in the OIS 140 and the output from the gyro sensor 220, which are observed by the digital video camera 100 according to the present embodiment. In FIG. 4, (a) is a diagram showing the change over time of the position of the correction lens 141 in the OIS 140, and (b) is a diagram showing the change over time of the output level of the gyro sensor 220. In both of (a) and (b) in FIG. 4, a horizontal axis represents time.

In the digital video camera 100, the OIS 140 moves the correction lens 141 in a direction in which a camera shake is compensated for, according to the output from the gyro sensor 220. In a great shake determination, the controller 210 determines whether or not the position of the correction lens 141 in the OIS 140 has exceeded threshold values (a threshold value A+ and a threshold value A−; hereinafter, referred to as the "threshold values A") for the output from the gyro sensor 220, a predetermined number or more of times within a predetermined period. Note that the controller 210 can recognize the position of the correction lens 141 based on the output from the detector 160. The controller 210 determines that the digital video camera 100 is shaken greatly when the position of the correction lens 141 has exceeded the threshold values A, greater than or equal to the predetermined number of times, within the predetermined period. In the present embodiment, the predetermined period is Δt and the predetermined number of times is three. That is, if the position of the correction lens 141 has exceeded the threshold values A three or more times during the period Δt, then it is determined that the digital video camera 100 is "shaken greatly". In the case of an example shown in (a) of FIG. 4, at time t1, the position of the correction lens 141 has exceeded the threshold values A three times, and thus, the controller 210 determines that the digital video camera 100 is shaken greatly. When it is determined that the digital video camera 100 is shaken greatly, the controller 210 moves the correction lens 141 to a central position of the OIS 140.

1-2-1-2 Great Shake Continuation Determination

A determination as to whether or not a great shake continues (great shake continuation determination) which is performed after a great shake determination will be described.

When it is determined that the digital video camera 100 is shaken greatly, the operation of the OIS 140 is stopped and the correction lens 141 is moved to the central position of the OIS 140. Therefore, even if the great shake of the digital video camera 100 continues, since the position of the correction lens 141 is controlled to the central position, the correction lens 141 does not move to any position exceeding the threshold values A. Hence, in the present embodiment, in a great shake continuation determination, the output from the gyro sensor 220 is used. Specifically, the controller 210 monitors whether or not the output value of the gyro sensor 220 has exceeded threshold values (a threshold value B+ and a threshold value B−; hereinafter, referred to as the "threshold values B") for the output from the gyro sensor 220, a predetermined number or more of times (three times in this example) within a predetermined period, and thereby determines whether or not the great shake continues. In an example shown in (b) of FIG. 4, during a period from time t1 at which it is determined that the digital video camera 100 is shaken greatly to time t2, the output from the gyro sensor 220 has exceeded the threshold values B four times. When, thereafter, a period during which the output does not exceed the threshold values B continues for a predetermined period (three fields in this example), it is determined that the great shake of the digital video camera 100 has ended. In the example in (b) of FIG. 4, since the output from the gyro sensor 220 has not exceeded the threshold values B during a period of three fields after time t2, the controller 210 determines that the great shake has ended at time t3. That is, the controller 210 determines that the great shake continues during a period from time t1 to time t3.

1-3 Summary

As described above, the digital video camera 100 according to the present embodiment controls the OIS actuator 150 to drive the correction lens 141 according to the amount of shake of the digital video camera 100 which is detected by the gyro sensor 220, until it is determined that the digital video camera 100 is shaken greatly. On the other hand, when it is determined that the digital video camera 100 is continuously shaken greatly, the digital video camera 100 stops the drive of the correction lens 141. The reasons that such control is performed will be described below.

When the digital video camera 100 is shaken greatly by the user, if the correction lens 141 is driven so as to compensate for the camera shake, the correction lens 141 may physically collide with an end of its movable range. This occurs because the correction lens 141 may move beyond an intended control position which is specified by the OIS actuator 150 due to the inertia of the correction lens 141 when the correction lens 141 is driven by the OIS actuator 150 as described above. In particular, when the correction lens 141 is shaken greatly and controlled to a position close to the end of the movable range, even with a little excess from the intended control position, there is a high likelihood of the correction lens 141 colliding with the end of the movable range. If the correction lens 141 physically collides with the end of the movable range, then the sound of collision occurs. As a result, the user may mistake it for a breakdown of the digital video camera 100. In addition, the collision may cause a breakdown. Hence, in the present embodiment, when it is determined that the digital video camera 100 is shaken greatly, the drive of the correction lens 141 is limited, thereby reducing the likelihood of the correction lens 141 physically colliding with the end of the movable range.

Once a great shake has been detected, the digital video camera 100 performs a great shake continuation determination based on the output from the gyro sensor 220. As such, in the great shake continuation determination, the output from the gyro sensor 220 is used instead of the position of the correction lens 141, whereby an actual shake of the digital video camera 100 can be detected with the correction lens 141 being controlled to be stopped.

The digital video camera 100 performs a great shake determination and a great shake continuation determination for the digital video camera 100 only when the focal length is longer than a predetermined value. Then, based on results of the determinations, the digital video camera 100 controls the drive of the correction lens 141. This is due to the fact that, as described above, in the digital video camera 100 according to the present embodiment, the shaking range of the correction lens 141 is greater when the focal length is long than when the focal length is short. That is, when the focal length is short, the correction lens 141 does not move significantly in the first place. Therefore, it is not likely that the correction lens 141 physically collides with the end of the movable range, and thus, the necessity to perform control for a reduction in collisions of the correction lens 141 is low.

Summarizing the above, the digital video camera 100 according to the present embodiment includes: the optical system 110, 170; the CCD image sensor 180 configured to capture a subject image formed by the optical system; the correction lens 141 configured to correct a shake of the subject image formed on the CCD image sensor 180; the OIS actuator 150 configured to drive the correction lens 141; the gyro sensor 220 configured to detect an amount of shake of the digital video camera 100; and the controller 210 configured to determine, based on an amplitude of an output from the gyro sensor 220, whether or not the shake of the digital video camera 100 is within a normal range of camera shake, and controls the OIS actuator 150 based on a result of the determination.

In particular, when it is determined that the shake of the digital video camera 100 is within the normal range of camera shake, the controller 210 controls the OIS actuator 150 to drive the correction lens 141 in a first mode where the correction lens 141 is driven according to a result of the detection by the gyro sensor 220. When it is determined that the shake of the digital video camera 100 is out of the normal range of camera shake, the controller 210 controls the OIS actuator 150 to stop the correction lens 141 or to drive the correction lens 141 in a second mode where an amount of movement of the correction lens 141 is suppressed more than that for the first mode. By such control by the controller 210, when a shake that is out of the normal range of camera shake is detected, the movement of the correction lens 141 (OIS function) is stopped or suppressed, enabling to reduce the likelihood of the correction lens 141 physically colliding with an end of its movable range. By this, the occurrence of the sound of collision is suppressed, enabling to reduce the likelihood that the user mistakenly believes that the digital video camera 100 has broken down. In addition, a breakdown caused by collision can be reduced.

2. Other Embodiments

The first embodiment is described above as an embodiment of the present invention. However, the present invention is not limited thereto. Now, other embodiments of the present invention will be summarized below.

The optical system and drive system of the digital video camera 100 according to the first embodiment are not limited to those shown in FIG. 1. For example, although an optical system of three groups is exemplified in FIG. 1, a lens configuration of other groups may be employed. In addition, the lenses may be composed of a single lens or may be configured as a lens group including a plurality of lenses.

Although the CCD image sensor 180 is exemplified as an imaging unit in the first embodiment, the present invention is not limited thereto. The imaging unit may be composed of, for example, CMOS image sensor or an NMOS image sensor.

Provided that the controller 210 can recognize the positions of the zoom lens 110 and the OIS 140, the detector 120 is not necessary.

In the first embodiment, a great shake determination and a great shake continuation determination for the digital video camera 100 (S110 and S130 to S190) are performed only when the focal length is longer than a predetermined value. Then, based on results of the determinations, drive stop control of the correction lens 141 is performed. However, a great shake determination and a great shake continuation determination for the digital video camera 100 and drive stop control of the correction lens 141 performed based on results of the determinations may be performed in the entire focal length range.

For the detector 120, the detector 160, the zoom motor 130, and the OIS actuator 150, a means of controlling each component may be interposed between each component and the controller 210.

When a great shake is detected, instead of stopping the correction lens 141, the amount of movement of the correction lens 141 may be suppressed. Specifically, the amount of movement of the correction lens 141 may be suppressed by changing the integral characteristics by multiplying an integral process for an output from the gyro sensor 220 by a specific coefficient. Alternatively, when a great shake is detected, instead of stopping the correction lens 141, limitations may be imposed on the movement range of the correction lens 141.

In a great shake determination at step S130 or a great shake continuation determination at step S170, the number of times the position of the correction lens 141 or the output from the gyro sensor 220 exceeds threshold values is a plural number, but may be one.

In the first embodiment, when the focal length is longer than a predetermined value and a great shake continues, the drive of the correction lens 141 (OIS function) is stopped. However, the configuration does not necessarily need to be like that. For example, when a great shake continues, instead of stopping the drive of the correction lens 141, the amount of movement of the correction lens 141 may be reduced. By this, while a certain degree of camera shake correction performance is achieved, the likelihood of the correction lens 141 colliding with the end of its movable range can be reduced.

INDUSTRIAL APPLICABILITY

The present invention can reduce the likelihood that a lens for camera shake correction collides with an end of its movable range, and thus, can be applied to imaging apparatuses having a camera shake correction function, such as digital video cameras and digital still cameras.

What is claimed is:

1. An imaging apparatus comprising:
    an optical system;
    an imaging device configured to capture a subject image formed by the optical system;
    a correction lens configured to correct a shake of the subject image formed on the imaging device;
    a gyro sensor detecting an amount of shake of the imaging apparatus; and
    a controller:
        determining, while the correction lens is being driven and moving, whether or not a position of the correction lens has exceeded a redetermined position more than a redetermined number of times, the predetermined number being more than one;
        changing a driving mode of the correction lens to a first mode when the position of the correction lens has not exceeded the predetermined position more than the predetermined number of times, the first mode being a mode where the correction lens is driven based on a result of the detection by the gyro sensor; and
        changing the driving mode of the correction lens to a second mode when the position of the correction lens has exceeded the predetermined position more than the predetermined number of times, the second mode being a mode where a drive of the correction lens is stopped or where an amount of movement of the correction lens is suppressed more than that for the first mode.

2. The imaging apparatus according to claim 1, wherein the controller:
    first determines, while the correction lens is being driven and moving, whether or not the position of the correction lens has exceeded the predetermined position more than the predetermined number of times;
    after the position of the correction lens has once exceeded the predetermined position more than the predetermined number of times, changes the driving mode of the correction lens to the second mode where the drive of the correction lens is stopped; and
    based on an amplitude of an output of the gyro sensor resulting from the detected amount of shake, whether or not the shake, which is outside of a specified range of camera shake, continues.

3. The imaging apparatus according to claim 1, further comprising a zoom lens movable along an optical axis of the optical system,
    wherein, when a focal length determined by a position of the zoom lens on the optical axis is not less than a predetermined value, the controller changes the driving mode of the correction lens.

4. The imaging apparatus according to claim 1, wherein the controller determines, while the correction lens is being driven and moving, whether or not the position of the correction lens has exceeded the predetermined position more than the predetermined number of times within a predetermined period.

* * * * *